United States Patent

Lyu

[11] Patent Number: 6,134,909
[45] Date of Patent: Oct. 24, 2000

[54] EVAPORATOR HOUSING

[75] Inventor: Jeong-Un Lyu, Kwangju, Rep. of Korea

[73] Assignee: Carrier Corporation, Farmington, Conn.

[21] Appl. No.: 09/200,294

[22] Filed: Nov. 25, 1998

[51] Int. Cl.$^7$ .................................................. F25D 17/04
[52] U.S. Cl. .............................................. 62/404; 62/427
[58] Field of Search .................... 62/259.1, 239, 62/298, 427, DIG. 16, 404

[56] References Cited

U.S. PATENT DOCUMENTS

| | | | |
|---|---|---|---|
| 3,315,488 | 4/1967 | Lind | 62/259.1 |
| 3,415,073 | 12/1968 | Ammons | 62/259.1 |
| 3,756,039 | 9/1973 | Riello . | |
| 4,607,499 | 8/1986 | Bolton et al. . | |
| 4,641,502 | 2/1987 | Aldrich et al. | 62/244 |
| 4,672,818 | 6/1987 | Roth | 62/239 |
| 5,222,374 | 6/1993 | Thompson et al. . | |
| 5,461,880 | 10/1995 | Bolton et al. . | |
| 5,638,693 | 6/1997 | Baek . | |

FOREIGN PATENT DOCUMENTS 5-32696  8/1994  Japan ..................................... 62/259.1

*Primary Examiner*—Henry Bennett
*Assistant Examiner*—Melvin Jones
*Attorney, Agent, or Firm*—Wall Marjama Bilinski & Burr

[57] ABSTRACT

A housing for physically and thermally isolating the evaporator section of an air conditioning unit that is mounted on the cabin roof of a trailer, van, or motor home. The housing is molded in two sections with the lower section being secured to the base pan of the unit over return air duct and the supply air duct formed in the pan. The housing is divided into a blower chamber containing the supply air duct and an evaporator coil chamber containing the return air duct. A converging nozzle is molded integrally into the housing which connects the evaporator coil chamber with the blower chamber. Elongated vertically disposed openings are provided in the side walls of the housing having guideways for contacting the tube sheets of an evaporator coil that is mounted in the evaporator coil chamber to prevent air from passing around said coil. Internal surfaces are provided within the housing for efficiently turning the air flow through the housing 180°.

11 Claims, 5 Drawing Sheets

EVAPORATOR HOUSING

BACKGROUND OF THE INVENTION

This invention relates generally to a housing for physically and thermally isolating the evaporator section of an air conditioning unit that is mounted on the roof of a vehicle such as a trailer, van or motorized home to provide conditioned air to the cabin of the vehicle.

Such roof top units are generally mounted upon a base pan with the evaporator section located to the front of the pan and the condenser section located to the rear of the pan. The compressor, fan drives and controls are centrally mounted between the front and rear sections on the unit. It was customary in many of the earlier units to create an internal superstructure of sheet metal to which the various unit components were attached or supported and enclosing the entire assembly by means of an outer housing or shroud. This type of assembly was relatively heavy and provided limited access to the component parts of the unit.

As disclosed in U.S. Pat. No. 4,672,818, to Roth many of the sheet metal parts in vehicle roof top units have been replaced by molded plastic sections which reduces the weight that the roof must support and provides freer access to internal parts allowing for improved ease of maintenance. The molded parts exhibited long life and are relatively impervious to weather. The unit described by Roth contains three main molded components that include a roof pan, an intermediate raised deck that runs the length of the roof pan, and an outer housing or shroud that covers the deck and is secured to the pan thereby enclosing the unit. Although the Roth unit represents a decided improvement over the earlier units, the intermediate deck prevents ready access to the components mounted under the deck and makes placement of the heat exchangers in the assembly rather difficult. Although the Roth unit is compartmentalized, the compartments do not truly isolate one section of the unit from another and air is able to move between compartments thus reducing the efficiency of the unit.

SUMMARY OF THE INVENTION

It is therefore an object of the present invention to improve air conditioning units that are installed on the cabin roof of a vehicle such as a trailer, van or motorized home.

A still further object of the present invention is to improve the performance of an air condition unit that is mounted on the cabin roof of a vehicle.

A still further object of the present invention is to more completely physically and thermally isolate the evaporator section of vehicle roof top air conditioners from other parts of the unit.

Yet a further object of the present invention is to provide a relatively air tight housing for the evaporator section of a vehicle roof top air conditioning unit.

Another object of the present invention is to simplify the construction of a vehicle roof top air conditioning unit.

Yet another object of the present invention is to reduce the number of parts in a vehicle roof top air conditioning unit without sacrificing the unit's efficiency.

Still another object of the present invention is to improve the ease of maintaining an air condition unit that is mounted on the roof of a vehicle.

These and other objects of the present invention are attained by a vehicle roof top air conditioning unit that includes an evaporator housing that physically and thermally isolates the evaporator section of the unit from the other sections. The housing includes a base pan having a return air duct and a supply air duct which communicate vertically with the cabin through the roof of the vehicle. An enclosure that contains front and rear walls, opposed side walls and a top wall is conjoined to the base pan to provide a relatively air tight structure over the return air duct and the supply ducts. The housing is molded in two sections that include a lower section that is secured to the base pan and an upper section that is removably secured to the lower sections. The housing contains a blower compartment that communicates with an evaporator compartment via a nozzle that is integrally molded as part of the housing. The nozzle converges from the evaporator compartment toward the blower compartment. The front wall of the housing contains an arcuate segment that curves rearwardly over the return air duct to direct return air entering the housing back toward the nozzle. Elongated openings are provided in the side walls of the housing through which the tube bends of an evaporator coil can protrude. Guideways are also located along the vertical edges of the elongated openings that arranged to close against the tube sheets of an evaporation coil to prevent air in process form passing around rather than through the coil. The blower chamber has a scroll shaped geometry that is arranged to encircle a blower mounted therein and conducts the blower discharge through the supply air duct.

BRIEF DESCRIPTION OF THE DRAWING

For a better understanding of these and other objects of the present invention, reference will be made to the following detailed description of the invention, which is to be read in association with the accompanying drawings, wherein.

DETAILED DESCRIPTION OF THE INVENTION

Figure 1:
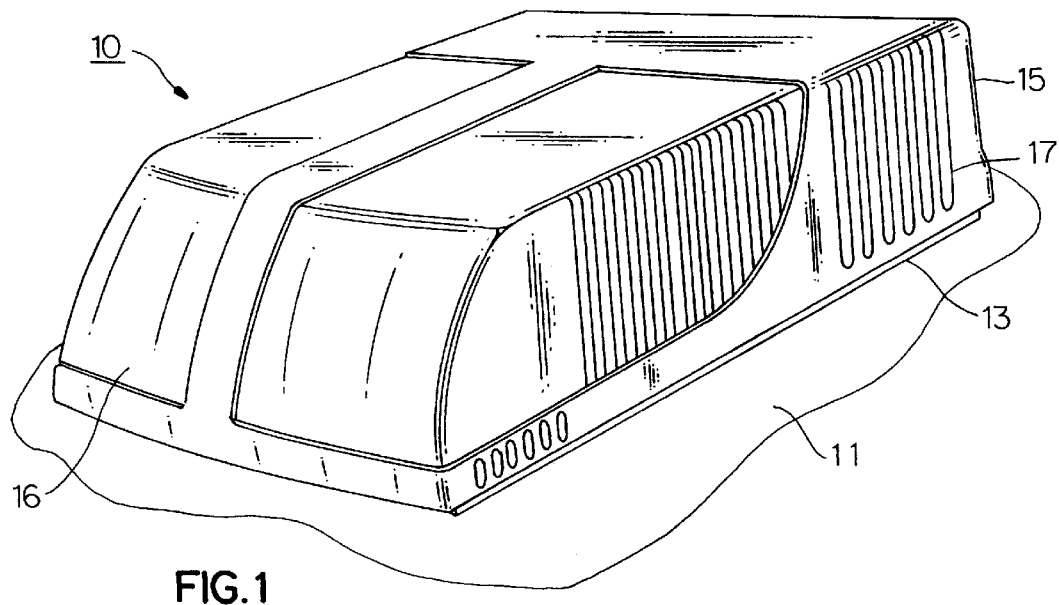
FIG. 1 is a perspective view illustrating a vehicle roof top air conditioning unit embodying the teachings of the present invention.
Figure 2:
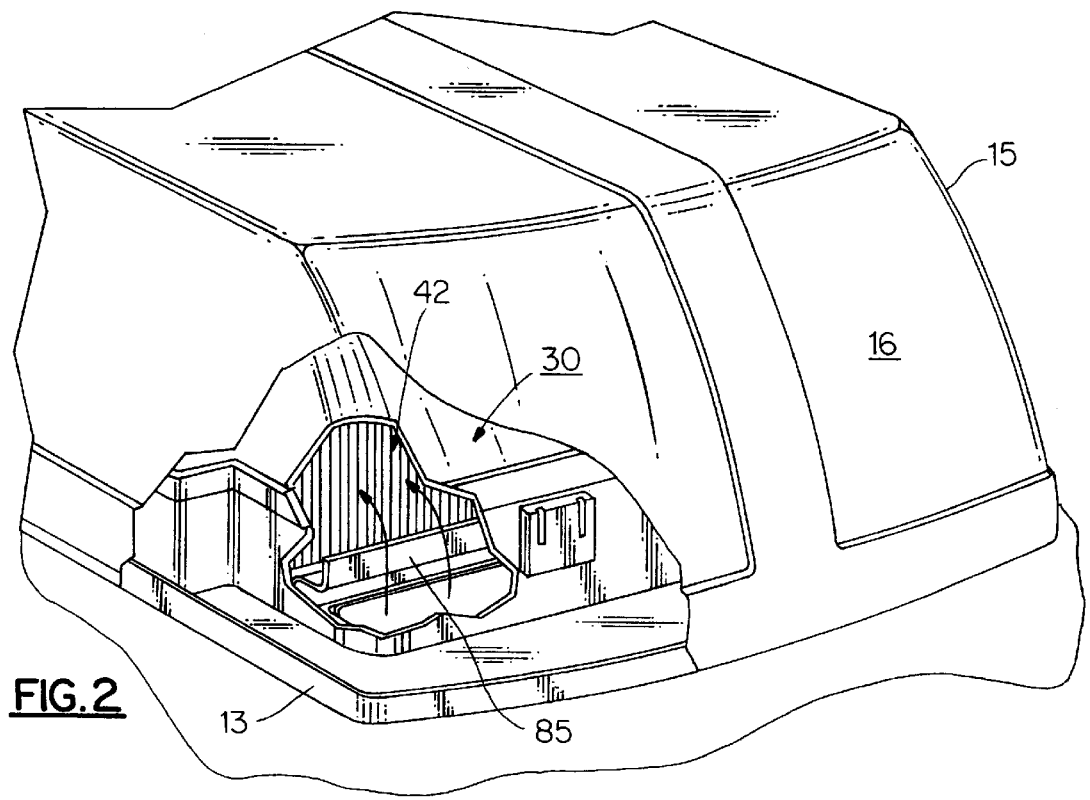
FIG. 2 is an enlarged partial perspective view of the unit illustrated in FIG. 1 showing a portion of the front of the unit broken away.

Turning initially to FIG. 1 there is illustrated a roof top air conditioning unit, generally referenced 10, that embodies the teachings of the present invention. The unit is mounted upon the cabin roof 11 of a vehicle such as a trailer, a van or a motorized home (sometimes referred to as a recreational vehicle or simply an RV). The unit includes a base pan 13 that is secured to the cabin roof by any suitable means such as threaded fasteners or the like and a shroud 15 that is removably connected to the base pan. The shroud has a streamlined front face 16 designed to reduce friction as it passes through the air as the vehicle to which the unit is attached moves in a forward direction. The shroud further includes a series of slotted openings 17 that are strategically positioned to permit ambient air to move into and out of the unit. The shroud and the pan are molded of high impact resistant plastic to provide a high strength, light weight assembly.

As noted above, with regard to the Roth patent, many vehicle roof top air conditioning units have been compartmentized wherein the condenser section is located in a first compartment, the evaporator section is placed in a second compartment, and the motor drive, compressor, and controls located in a third compartment between the other two. The compartments are generally separated by molded walls that are arranged to isolate one section of the unit from the other. As will be explained below in further detail, the present invention moves away from the multiple compartment concept and greatly simplifies the internal construction of a vehicle roof top air conditioning unit to provide for ease of access while reducing the weight of the unit without sacrificing performance. The present unit contains a molded two-piece housing that encloses the evaporator section of the unit to isolate the evaporator component both physically and thermally from the remainder of the system. The remaining components are mounted on the base pan in a generally open arrangement so that ambient air can flow freely thereabout to provide cooling to the uncompartmentized components as well as ready access to the components mounted therein. The entire assembly is enclosed by the shroud and is affixed to the base pan.

With further reference to FIGS. 3–9, there is illustrated the present air conditioning unit with the shroud removed. The unit includes an L-shaped condenser coil 19 that faces the rear of the unit and which is secured to the base pan by any suitable means. A motor 20, having a pair of horizontally disposed shafts 21 and 22, is also secured to the base pan along with a compressor 25 forward of the condenser section. A condenser fan 26 (FIG. 3) is attached to shaft 21 while an evaporator blower 27 is similarly affixed to shaft 22.

The evaporator blower 27 is contained within an evaporator housing generally referenced 30. The housing is split horizontally into two sections includes a lower section 31 that is secured to the base pan by any suitable means and an upper section 33 that is removably connected to the lower section by spring biased latches 35 (FIG. 9) that are mounted in pairs along the top edge periphery of the lower section of the housing. Each latch contains a hook-like appendage 36 that is carried upon the distal end of elongated resilient arms 37. The hooks are arranged at closure to snap over horizontally disposed lugs 38 (FIG. 6) located on the upper housing section along the lower edge thereof.

Figure 3:
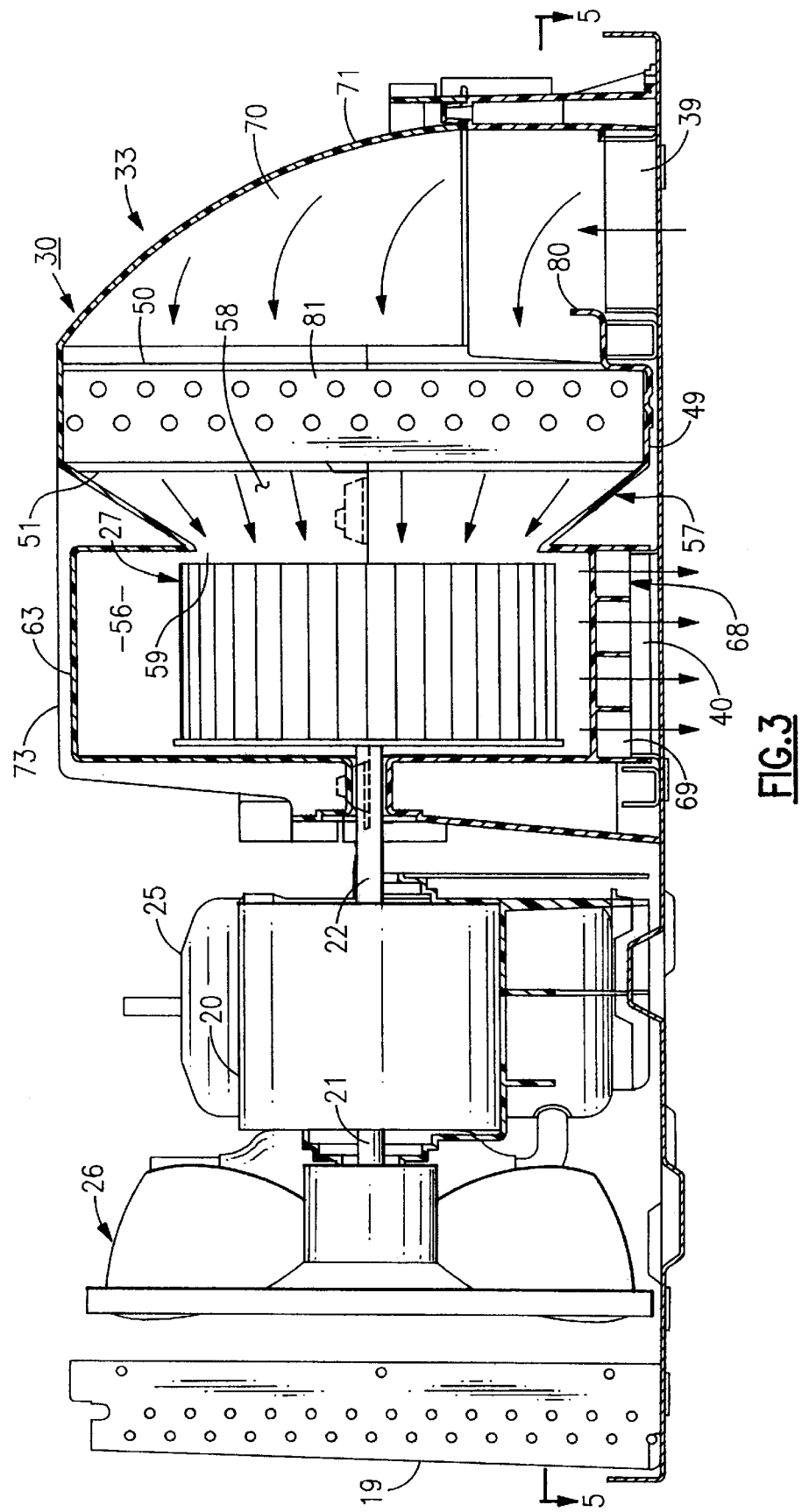
FIG. 3 is an enlarged side elevation in section of the unit illustrated in FIG. 1 with the shroud and other parts removed to more clearly show the construction of an evaporator housing for isolating the evaporator section of the unit from other parts of the unit.
Figure 4:
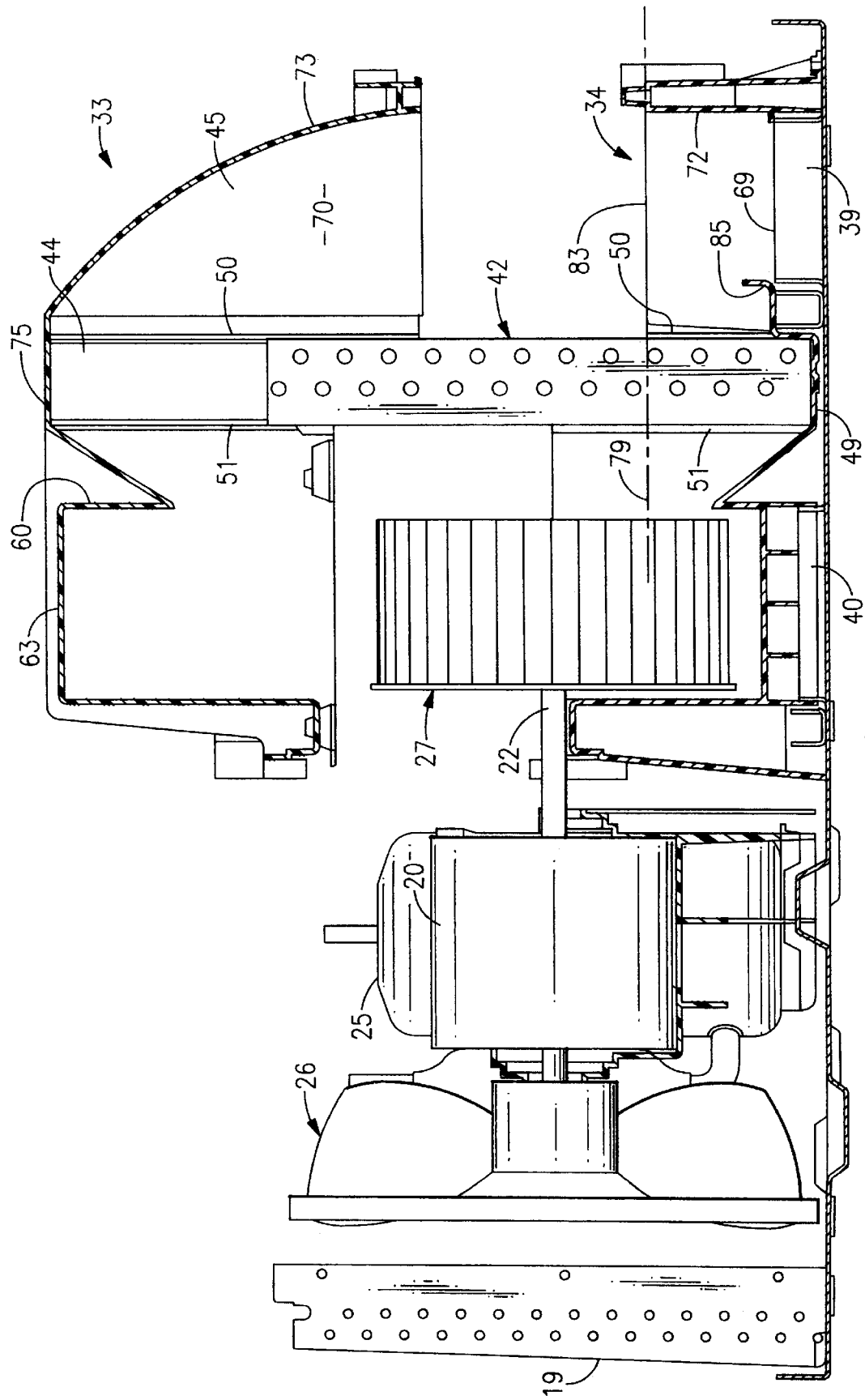
FIG. 4 is similar to FIG. 3 further showing the upper section of the evaporator housing removed from the lower section.
Figure 5:
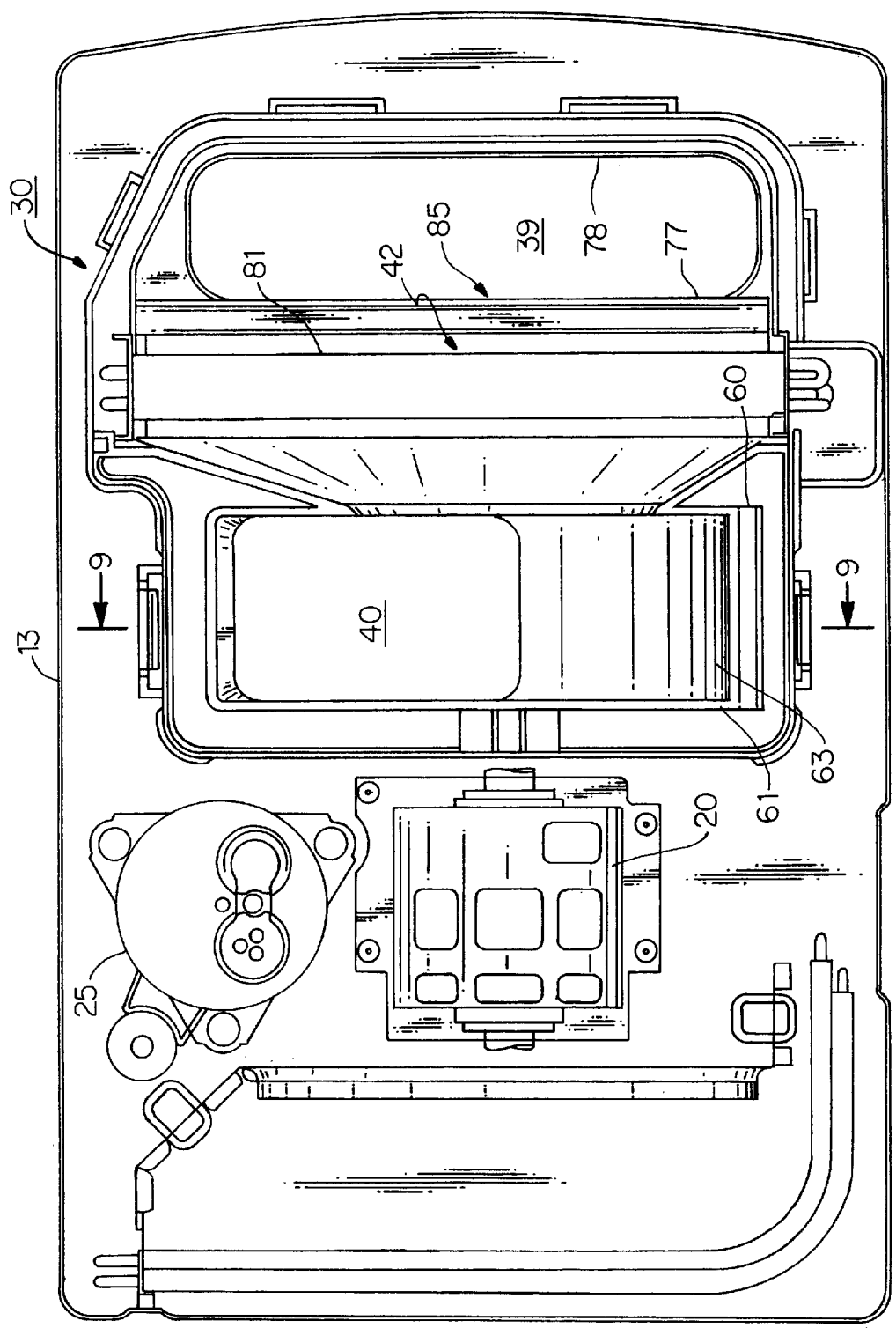
FIG. 5 is a section taken along lines 5—5 in FIG. 3 with the evaporator blower and the condenser fan removed to more clearly show the interior structure of the unit.
Figure 6:
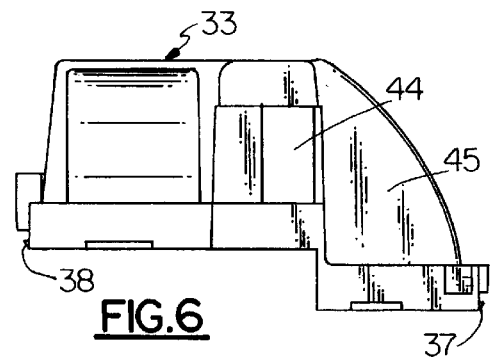
FIG. 6 is a side elevation showing the upper section of the evaporator housing.
Figure 7:
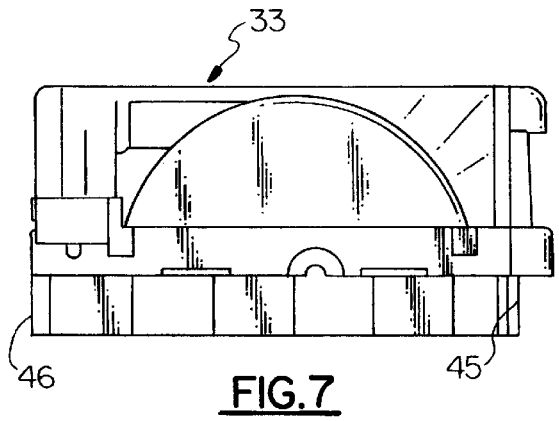
FIG. 7 is an end view of the upper section illustrated in FIG. 6.
Figure 8:
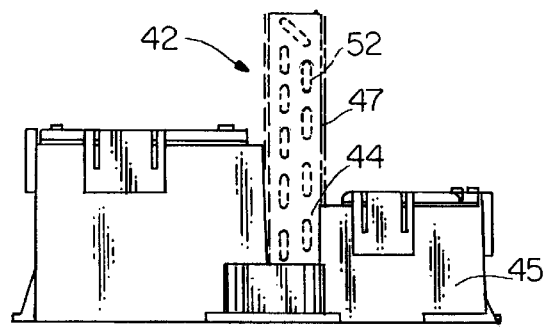
FIG. 8 is a side elevation of the lower section of the evaporator section.
Figure 9:
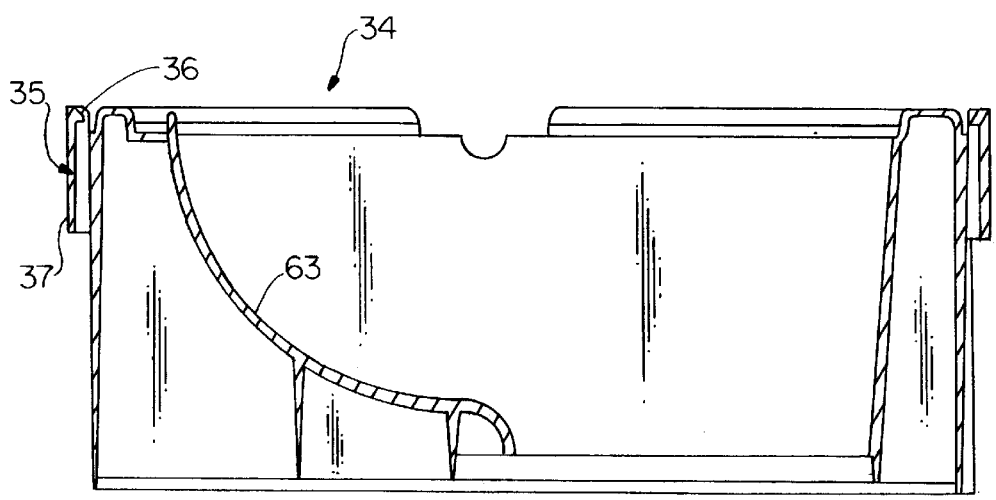
FIG. 9 is an enlarged side elevation in section of the lower section of the evaporator housing.

Both the upper section and the lower section of the evaporator housing are molded from high strength, high impact resistant plastic. As best illustrated in FIGS. 3–5, the lower section of the housing is positioned over both the return air duct 39 and the supply air duct 40 of the system, both of which communicate with the vehicle cabin. Air enters and leaves the housing vertically and accordingly, the air stream must be turned 180° within a very limited amount of space. An evaporator coil 42 is mounted inside the housing adjacent to and to the rear of the return air duct. The two sections at closure cooperate to establish elongated vertically disposed openings 44 in the opposed side walls 45 and 46 of the housing adjacent to the tube sheets 47 of the evaporator coil. A pair of opposed guideways 50 and 51 are integrally molded along the inside of the side walls of the housing adjacent the vertical edges of each opening. The guideways are adapted at closure to contact the opposed tube sheets of the coil and provide a relatively leak tight joint therebetween. In assembly, the coil rests upon a seat 49 that is located on the floor of the housing and the tube bends 52 associated with the evaporator coil extend outwardly through the elongated openings thus providing for easy installation of the coil and unobstructed installation and removal of the upper section of the housing.

The housing 30 contains two chambers which are the evaporator coil chamber 55 located at the front of the housing and the blower chamber 56 located at the front of the housing. A converging nozzle 57 is molded integrally into the walls of the housing through which the evaporator chamber communicates with the blower chamber. The nozzle has a rectangular shaped entrance 58 that frames the exit face 82 of evaporator coil and a circular exit 59 that encircles the air intake to the blower 27. The nozzle opens into the blower chamber through the vertical front wall 60 of the blower chamber which again is integrally molded as part of the housing.

The blower, in assembly, is mounted directly over the supply air duct and is encircled by a scroll 63 which empties into the supply air duct. The rear wall 60 of the evaporator chamber and the back wall 61 of the housing are cojoined with the scroll to enclose the blower chamber to provide a diverging flow passage for the conditioned supply air discharged by the blower thereby increasing the velocity of the supply air entering the cabin of the vehicle.

A stanchion 65 is molded into the back wall 66 of the housing adjacent to the blower section 34 thereof. The stanchion provides additional strength to the housing and cooperates with the upper section of the housing at closure to provide an opening 67 through which the motor shaft 22 passes into the blower chamber. As noted above, the shaft is affixed to the blower wheel and turns the wheel at a desired speed to pump conditioned air delivered by the nozzle through the supply air duct. A distributor 68 is mounted between the walls 60 and 61 of the blower over the supply duct chamber that contains a series of passages 69 for uniform distributing the discharged conditioned air across the supply air duct.

Return air from the vehicle is recirculated back to the unit through return air duct 39 that forms the entrance 69 (FIG. 4) to an air plenum 70 that is located at the front of the evaporator housing. The front wall 71 of the housing also serves as the front wall of the plenum while the entrance face 81 of the evaporator coil serves as the back wall of the plenum. The front wall includes two segments that are a lower vertical segment 72 and an upper arcuate shaped segment 73 (FIG. 4). The upper wall segment is fully contained in the upper section 33 of the evaporator housing and is integrally joined to the top wall 75 of the housing. The lower wall segment is similarly fully contained within the lower section 34 of the housing.

The entrance to the plenum is generally rectangular shaped as illustrated in FIG. 5 and contains an inner edge 77 that is parallel with and spaced apart from the entrance face 81 of the evaporator coil. The outer edge 78 of the plenum entrance is spaced apart from the inner edge 77 and runs generally parallel with and along the lower wall segment of the front wall. The arcuate upper segment of the front wall generally describes the arc of a circle and curves back toward the evaporator coil so that it completely overlies the return air entrance. The center of curvature of the upper wall segment lies in a horizontal plane 79 that defines the top edge 83 of the lower wall segment (FIG. 4).

A stabilizer 85 is mounted along the inner edge of the plenum entrance. The stabilizer is a vertical panel that is molded as an integral part of the housing. The stabilizer has a height that is less than the height of the lower segment of the front wall so that it is fully contained within the lower section of the housing. The stabilizer is spaced apart from the entrance face of the evaporator coil to permit return air to pass behind the panel and is set back from the entrance face of the coil a distance that is about equal to the height of the panel. The height of the stabilizer is also matched to the radius of curvature of the upper front wall segment to control the flow of return air through the plenum. The two are designed to act in concert to turn the incoming return air flow 90° and direct the flow uniformly across the entrance face of the evaporator coil. In addition, the stabilizer acts like a wing spoiler on an aircraft to prevent turbulence from developing along the entrance surface of the evaporator coil. Any turbulence that might develop in this region takes the form of vortices that act to inhibit air flow into the coil and thus reducing the performance of the coil.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. An evaporator housing for an air conditioning unit mounted upon the roof of a vehicle cabin that includes:

a base pan secured to a vehicle cabin roof, said base pan having a return air duct through which air passes vertically out of said cabin and a supply air duct through which conditioned air passes vertically into said cabin;

an enclosure that is mounted over the return air and supply air ducts that includes front and rear walls and opposed side walls, all of which are mounted upon the base pan and a top wall that is conjoined to said other walls to provide an air tight enclosure for containing an evaporator section of an air condition system;

said walls combining to form a blower chamber over the supply air duct and an evaporator chamber over the return air duct;

said enclosure further including a nozzle that passes between said chambers, said nozzle being integral with the housing and converges from the evaporator coil chamber exit face toward the blower chamber, said nozzle converging from a rectangular-shaped entrance to a circular exit; and said front wall of the enclosure containing an arcuate shaped upper segment for directing return air toward said nozzle.

2. The housing of claim 1 that further includes an interior wall at the front of the blower chamber through which the nozzle opens into said blower chamber.

3. The housing of claim 2 that further includes a scroll shaped wall surrounding the blower chamber for directing air into said supply air duct.

4. The housing of claim 1 wherein the rear wall of said enclosure contains an opening through which a drive shaft can pass into the blower chamber.

5. An evaporator housing for an air conditioning unit mounted upon the roof of a vehicle cabin that includes:

a base pan secured to a vehicle cabin roof, said base pan having a return air duct through which air passes vertically out of said cabin and a supply air duct through which conditioned air passes vertically into said cabin;

an enclosure that is mounted over the return air and supply air ducts that includes front and rear walls and opposed side walls, all of which are mounted upon the base pan and a top wall that is conjoined to said other walls to provide an air tight enclosure for containing an evaporator section of an air condition system;

said walls combining to form a blower chamber over the supply air duct and an evaporator chamber over the return air duct;

said enclosure further including a nozzle that passes between said chambers, said nozzle being integral with the housing and converges from the evaporator coil chamber exit face toward the blower chamber; and said front wall of the enclosure containing an arcuate shaped upper segment for directing return air toward said nozzle;

wherein said opposed side walls of the enclosure contain parallely aligned, vertically disposed, elongated openings located in the evaporator chamber rearward of the return air duct, each side wall further including vertical guides positioned along the interior vertical edges of each elongated opening, said guides being arranged to contact opposed tube sheets of an evaporator coil to form an air tight joint between the tube sheets and the side walls of the enclosure.

6. An evaporator housing for an air conditioning unit mounted upon the roof of a vehicle cabin that includes:

a base pan secured to a vehicle cabin roof, said base pan having a return air duct through which air passes vertically out of said cabin and a supply air duct through which conditioned air passes vertically into said cabin;

an enclosure that is mounted over the return air and supply air ducts that includes front and rear walls and opposed side walls, all of which are mounted upon the base pan and a top wall that is conjoined to said other walls to provide an air tight enclosure for containing an evaporator section of an air condition system;

said walls combining to form a blower chamber over the supply air duct and an evaporator chamber over the return air duct;

said enclosure further including a nozzle that passes between said chambers, said nozzle being integral with the housing and converges from the evaporator coil chamber exit face toward the blower chamber; and said front wall of the enclosure containing an arcuate shaped upper segment for directing return air toward said nozzle;

wherein said housing further includes a lower section affixed to the base pan and an upper section that is removably joined to the lower section.

7. The housing of claim 1 wherein the arcuate shaped segment of said front wall is mounted in the upper section of the enclosure.

8. The housing of claim 6 wherein one section of said enclosure contains a plurality of spring biased latches that are adapted to snap over lugs mounted on the other section to secure the section in air tight closure when the sections are brought together in assembly.

9. The housing of claim 7 wherein the arcuate shaped segment of the front wall extends across the width of the return air duct.

10. The housing of claim 6 wherein the upper and lower sections are each molded from plastic.

11. The housing of claim 6 that further includes a flow deflector integrally molded in said lower section of the enclosure over the supply air duct to direct a uniform flow of air into said supply air duct.

* * * * *